(No Model.)
T. H. HAMILTON.
Machine for Soldering Square Cans.
No. 233,673. Patented Oct. 26, 1880.
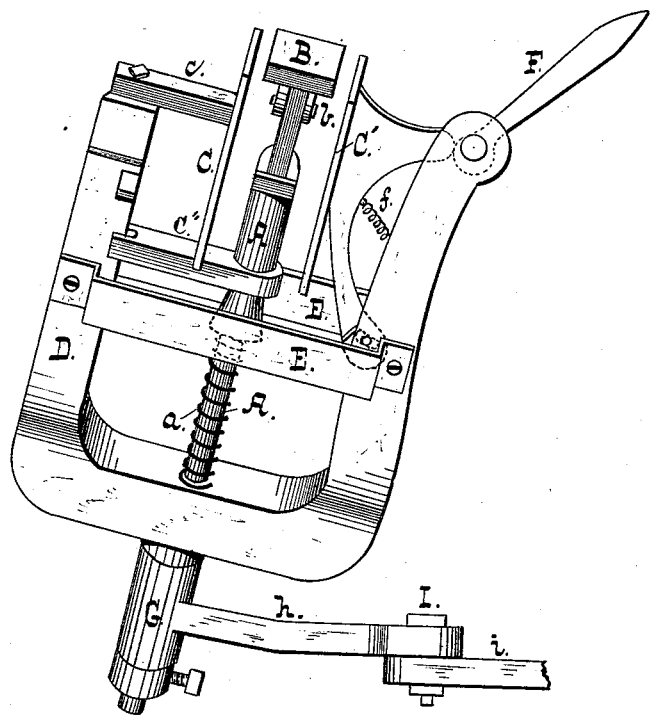

UNITED STATES PATENT OFFICE.

THOMAS H. HAMILTON, OF BALTIMORE, MARYLAND, ASSIGNOR TO THOMAS TANSLEY, JR., AND ALEXANDER McILVAIN, OF SAME PLACE.

MACHINE FOR SOLDERING SQUARE CANS.

SPECIFICATION forming part of Letters Patent No. 233,673, dated October 26, 1880.

Application filed August 27, 1880. (No model.)

*To all whom it may concern:*

Be it known that I, THOMAS H. HAMILTON, of Baltimore city, State of Maryland, have invented certain new and useful Improvements in Machines for Soldering Square Cans; and I hereby declare the same to be fully, clearly, and exactly described as follows, reference being had to the accompanying drawing, in which a machine embodying my present improvement is illustrated in perspective view.

My invention has reference to machines for soldering the heads to the bodies of what are known as "square cans," commonly used for containing raw oysters; and it consists in certain improvements upon the device for which Letters Patent No. 204,315 were granted May 28, 1878, to one of my present assignees, assignee of Richard Gornall, of Baltimore, the specific points of novelty being indicated in the claims.

In cans of the class referred to the edges of the walls are turned inward at the ends, forming flanges against which the heads are pressed from the inside and soldered in place.

To apply the heads to the body of the can an upright standard is used, having a plate, technically called a "tumble-block," pivoted upon its upper end. The perforated head being inserted in the can-body the latter is pressed down over the standard, the tumble-block holding the head against the flange, and the seam is soldered by means of an ordinary soldering-iron. The can is then removed, the other head is inserted edgewise, the tumble-block and standard are passed through the cap-hole to hold the head, and the soldering is done as at the other end.

Pending the soldering the head of the can is horizontal, and the difficulty has been experienced that the solder will not always freely follow the iron, rendering it necessary to pass the iron two or three times over a part or the whole of the seam. I obviate this difficulty and at the same time secure an economy of solder by simply inclining the axis of the standard, whereby gravity aids in causing the solder to follow the iron and a smaller charge of solder suffices to secure the seam than has heretofore been requisite.

In the accompanying drawing, A is the standard, having a tumble-block, B, pivoted thereto at $b$. D is a yoke, to which is secured at one end an arm, $c$, carrying the fixed jaw C of the clamp, and rests E E connect the two arms of the yoke, serving to brace it against the strain caused by the clamp, and answering a further and important end in furnishing a support on either side of the standard for the end of the can, the upper edges of the rests lying in a plane truly at right angles with the axis of the standard.

The movable jaw C' of the clamp is normally retracted by means of a spring, $f$, and is caused to approach the opposite jaw by means of a cam-lever, F.

The standard A is enveloped by a spring, $a$, which normally thrusts it upward with reference to the yoke, but admits of the latter being lifted when desired.

$c$ is an arm rigidly attached to the standard and having a terminal slot that embraces one side of the yoke, the object being to prevent rotation of the standard with reference to the yoke.

The standard swivels freely in a sleeve, G, secured to an arm, $h$, which is, or may be, pivoted, as at I, to a second arm, $i$, which is affixed to a revolving table, the design being to admit of a number of the devices being used at once, a boy or unskilled hand applying the cans while a skilled workman solders them in succession as they come opposite him.

In operation, the lever F being lifted the yoke is raised and a can having its head inserted is placed over the standard, the lower edge of the can resting upon the bars E, where it is clamped by depressing the lever F. The yoke is then released and the tumble-block presses the head closely against the end flange. The solder is then applied along the seam, commencing at the upper corner, the can being revolved a quarter of a turn as each seam is completed. The other head is next secured in the same way, and the can is complete.

The peculiar tilt of the can—namely, in a plane through the diagonally-opposite edges—is of especial importance, as it causes the solder to flow under the flange just where it is needed instead of spreading itself over the head, as it tends to do when the same is soldered in a horizontal position. The iron, furthermore, in the described operation tends to gravitate toward the seam and force the solder under the flange, and increased convenience as well as saving of time and material result.

I am aware that it is not new, broadly, to solder cans in an inclined position, and such I do not claim.

What I claim is—

1. In a machine for soldering square cans, an inclined swiveling standard having a tumble block and a clamping device, arranged and operating as set forth.

2. In a machine for soldering square cans, an inclined standard surmounted by a tumble-block, in combination with the yoke D and rests E, secured to opposite sides of the same, as set forth.

3. In combination with the inclined standard having tumble-block, the rests E, secured to opposite sides of the yoke D, and the clamping device, as set forth.

4. In combination with the arm $h$, having the inclined sleeve G, the yoke D, arranged to revolve within the sleeve, and having the rests E connecting its arms, and the central standard and tumble-block, as set forth.

THOS. H. HAMILTON.

Witnesses:
R. D. WILLIAMS,
JNO. T. MADDOX.